(12) United States Patent
Sumi

(10) Patent No.: US 6,849,020 B2
(45) Date of Patent: Feb. 1, 2005

(54) CONTINUOUSLY VARIABLE POWER-SPLIT TRANSMISSION

(75) Inventor: Yasuo Sumi, Shizuoka (JP)

(73) Assignee: JATCO Ltd, Fuji (JP)

(*) Notice: Subject to any disclaimer, the term of this patent is extended or adjusted under 35 U.S.C. 154(b) by 0 days.

(21) Appl. No.: 10/461,381

(22) Filed: Jun. 16, 2003

(65) Prior Publication Data

US 2004/0033858 A1 Feb. 19, 2004

(30) Foreign Application Priority Data

Aug. 7, 2002 (JP) ........................................ 2002-229481

(51) Int. Cl.$^7$ ............................................. F16H 37/02
(52) U.S. Cl. ...................... 475/214; 475/211; 475/215; 475/216; 475/219; 476/40; 476/41; 476/42
(58) Field of Search ................................ 475/211, 214, 475/215, 216, 219; 476/40, 41, 42

(56) References Cited

U.S. PATENT DOCUMENTS

| | | | | |
|---|---|---|---|---|
| 5,453,061 A | * | 9/1995 | Fellows | 475/215 |
| 5,564,998 A | * | 10/1996 | Fellows | 475/216 |
| 6,063,002 A | * | 5/2000 | Nobumoto et al. | 477/41 |
| 6,171,210 B1 | * | 1/2001 | Miyata et al. | 475/216 |
| 6,251,039 B1 | * | 6/2001 | Koga | 475/216 |
| 6,561,942 B2 | * | 5/2003 | Wehking | 475/216 |
| 6,705,964 B2 | * | 3/2004 | Nagai et al. | 475/216 |

FOREIGN PATENT DOCUMENTS

| | | | | |
|---|---|---|---|---|
| JP | 01216160 A | * | 8/1989 | F16H/15/38 |
| JP | 11-63147 A | | 3/1999 | |

OTHER PUBLICATIONS

P. Tenberge et al., "Toroidal Traction Drive with Axial Ratio Change", VDI Beriorte NR. 1565, 2000, p. 227–257.

* cited by examiner

Primary Examiner—Saul Rodriguez
Assistant Examiner—David D. Le
(74) Attorney, Agent, or Firm—Foley & Lardner LLP

(57) ABSTRACT

The second platenary gear mechanism 18 is a so-called double pinion type planetary gear comprising a sun gear 18a, paired pinions 18b, a carrier 18c which supports the pinions, and a ring gear 18d. The pinions 18b of eeach pair meshes with each other in a state where one of the paired pinions 18b meshes with the sun gear 18a while the other one of the paired pinions 18b meshes with the ring gear 18d. The carrier 18c is coupled to the countershaft 20 and the sun gear 18a is connected to a shaft 11a which is coupled to a gear 11b of a third gear unit 11.

6 Claims, 1 Drawing Sheet

CONTINUOUSLY VARIABLE POWER-SPLIT TRANSMISSION

FIELD OF THE INVENTION

This invention relates to a continuously variable power-split transmission using a toroidal variator.

BACKGROUND OF THE INVENTION

JP11-063147 published by the Japanese Patent Office in 1999, discloses a continuously variable power-split transmission for a vehicle. This continuously variable power-split transmission is provided with a toroidal continuously variable transmission mechanism (variator) and a fixed speed ratio transmission mechanism having identical rotational inputs. The outputs of these transmission mechanisms are input into a planetary gear mechanism. When the vehicle is running in a high speed mode, the rotational output of the planetary gear mechanism is applied for driving the wheels of the vehicle, and when the vehicle is running in a low speed mode, the rotational output of the variator is applied for driving the wheels of the vehicle, thereby enlarging the speed ratio range and achieving a high power transmission efficiency.

In this continuously variable power-split transmission, all of the rotational input in low speed mode passes through the variator, and therefore the power transmission efficiency in low speed mode cannot exceed the power transmission efficiency of the variator. Further, since all of the rotational input in low speed mode passes through the variator, a variator with a large transmission torque capacity is required, and as a result it is difficult to reduce the size of the variator.

SUMMARY OF THE INVENTION

VDI Berichte Nr. 1565, 2000, P.256, Bild 20 discloses a continuously variable power-split transmission wherein the rotational input is first split by a planetary gear mechanism and the split rotation is then input into a variator and a fixed gear transmission mechanism. According to this transmission, the rotational input is split between the variator and the fixed gear transmission mechanism in both low speed mode and high speed mode, and the rotational input passing through the variator is reduced as a result. Therefore, a high degree of transmission efficiency is achieved in both modes and the variator may be reduced in size.

In this continuously variable transmission, power rollers are supported in the variator between an input disk and an output disk by means of a thrusting force applied to the input disk by a mechanical loading mechanism. This thrusting force increases as the rotational torque input into the variator from the planetary gear mechanism increases.

As regards the transmission direction of the rotational torque of the variator, in low speed mode the rotational torque is transmitted from the input disk to the output disk. This rotational torque is equal to the rotational torque which is input into the variator from the planetary gear mechanism. In high speed mode, on the other hand, the rotational torque is transmitted from the output disk to the input disk. In this case also, the power rollers supported in the variator between the input disk and the output disk by means of a thrusting force applied to the input disk by the mechanical loading mechanism.

Here, the amount of thrusting force required to support the power rollers increases as the torque transmitted between the disks increases. In high speed mode, however, the thrusting force applied to the input disk by the mechanical loading mechanism for supporting the power rollers is not commensurate with the torque which is transmitted by the variator, and as a result the amount of thrusting force required for supporting the power rollers may be lacking in relation to the transmitted torque. When the thrusting force is insufficient, slippage occurs between the power rollers and the input disk or output disk, causing a reduction in the power transmission efficiency of the variator and expediting damage to the power rollers and disks.

It is therefore an object of this invention to reduce slippage between a power roller and a disk in a continuously variable power-split transmission.

In order to achieve the above object, this invention provides a continuously variable power-split transmission comprising an input shaft which is driven by an engine, an output shaft, a first differential gear mechanism which comprises a first rotating member connected to the input shaft, a second rotating member, and a third rotating member, and which distributes the rotation of the first rotating member between the second rotating member and the third rotating member, a countershaft, a toroidal variator, a first power transmission mechanism, a second power transmission mechanism for transmitting the rotation of the third rotation member to the countershaft, and a clutch device.

The toroidal variator and the first power transmission mechanism are connected in series for transmitting rotation between the second rotating member and the countershaft. The toroidal variator comprises an input disk, an output disk, and a power roller which is gripped between the input disk and output disk by a thrusting force corresponding to the rotational torque of the second rotating member. The first power transmission mechanism transmits rotation between the output disk and the countershaft. The clutch device selectively transmits the rotation of the countershaft and the rotation of the input disk to the output shaft.

A reduction ratio R1 relating to the transmission of rotation by the first transmission mechanism from the output disk to the countershaft, a reduction ratio R2 of the second power transmission mechanism, and a speed ratio α1 of the third rotating member and the second rotating member are set to values at which, in a state where the clutch device is transmitting the rotation of the input disk to the output shaft, the rotational torque of the second rotating member does not fall below the rotational torque which is transmitted from the first power transmission unit to the output disk.

The details as well as other features and advantages of this invention are set forth in the remainder of the specification and are shown in the accompanying drawings.

DESCRIPTION OF THE PREFERRED EMBODIMENTS

Figure 1:
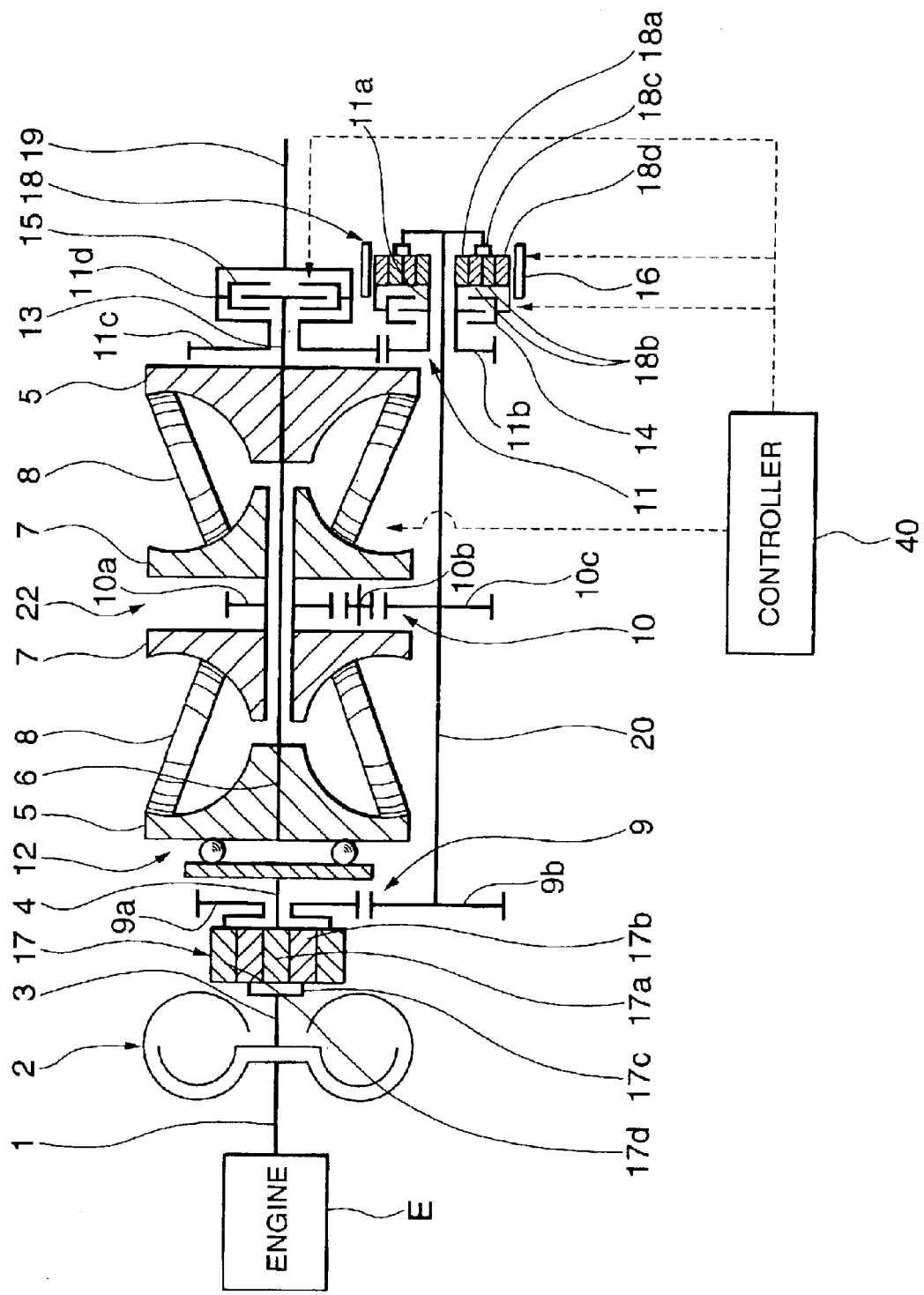
FIG. 1 is a schematic diagram of a continuously variable power-split transmission according to this invention.

Referring to FIG. 1, an input shaft 1 of a vehicle engine E outputs rotational torque through a vehicle starting device 2 such as a torque converter to an input shaft 3.

The input shaft 3 is coupled to a carrier 17c of a first planetary gear mechanism 17. A part of the rotational torque which is transmitted from the input shaft 3 to the carrier 17c is transmitted to a sun gear 17a of the first planetary gear mechanism 17, and the remaining rotational torque is transmitted to a ring gear 17d thereof. For this purpose, a plurality of pinions 17b each of which meshes with the sun gear 17a and the ring gear 17d are supported by the carrier 17c. Herein, the carrier 17c represents a first rotating member, the sun gear 17a represents a second rotating member, and the ring gear 17d represents a third rotating member in the claims.

The rotational torque which is transmitted to the sun gear 17a is transmitted to a mechanical loading mechanism 12 through a variator input shaft 4 which is disposed on the same axis as the input shaft 3. The mechanical loading mechanism 12 transmits the rotational torque to a double cavity toroidal variator 22.

The variator 22 comprises a pair of opposing input disks 5 which are coupled to an input disk connecting shaft 6. The pair of input disks 5 are rotated integrally with the variator input shaft 4 by the mechanical loading mechanism 12. A pair of output disks 7 which are attached to the variator input shaft 4 with clearance therebetween are disposed relative to the pair of input disks 5 between the input disks 5. The pair of output disks 7 are coupled to each other and rotate synchronously. The input disk connecting shaft 6 corresponds to the rotational axis of the double cavity toroidal variator 22.

A plurality of power rollers 8 are supported between the input disks 5 and output disks 7 such that the power rollers 8 can tilt.

The output disks 7 are coupled to a gear 10a of a first gear unit 10. The rotational torque of the output disks 7 is transmitted through the first gear unit 10 which is constituted by the gear 10a, a gear 10b, and a gear 10c to a countershaft 20 which is disposed parallel to the input shaft 3.

Meanwhile, the ring gear 17d of the first planetary gear mechanism 17 is coupled to a gear 9a of a second gear unit 9. The rotational torque of the ring gear 17d is transmitted through the second gear unit 9 which is constituted by the gear 9a and a gear 9b to the countershaft 20.

The first planetary gear mechanism 17 constitutes a differential gear mechanism for distributing rotational torque. The first gear unit 10 and second gear unit 9 correspond respectively to a first power transmission mechanism and a second power transmission mechanism.

The countershaft 20 is also coupled to the gear 10c of the first gear unit 10. As a result, the rotational torque which is transmitted through the variator 22 and the first gear unit 10 and the rotational torque which is transmitted through the second gear unit 9 converge at the countershaft 20. A second planetary gear mechanism 18 is disposed on the end of the countershaft 20. The second planetary gear mechanism 18 corresponds to a second differential gear mechanism.

The second planetary gear mechanism 18 is a so-called double pinion type planetary gear comprising a sun gear 18a, paired pinions 18b, a carrier 18c which supports the pinions, and a ring gear 18d. The pinions 18b of each pair meshes with each other in a state where one of the paired pinions 18b meshes with the sun gear 18a while the other one of the paired pinions 18b meshes with the ring gear 18d. The carrier 18c is coupled to the countershaft 20 and the sun gear 18a is connected to a shaft 11a which is coupled to a gear 11b of a third gear unit 11.

Further, a reverse brake 16 for allowing and restricting the rotation of the ring gear 18d is provided between the ring gear 18d and the housing of the planetary gear mechanism 18. A low speed advance mode clutch 14 for allowing and disallowing interlocking of the second planetary gear mechanism 18 is also provided. The second planetary gear mechanism 18 and the reverse brake 16 constitute a second differential gear mechanism.

The gear 11b of the third gear unit 11 is meshed with a gear 11c which comprises an output shaft 11d of the third gear unit 11. The output shaft 11d of the third gear unit 11 is connected to an output shaft 19 of the continuously variable power-split transmission.

Further, the end portion of the input disk connecting shaft 6 of the double cavity toroidal variator 22 is coupled to a bypass shaft 13, and a high speed advance mode clutch 15 which is capable of allowing and disallowing transmission of the power of the bypass shaft 13 through the output shaft 11d of the third gear unit 11 to the output shaft 19 of the continuously variable power-split transmission is provided between the bypass shaft 13 and the third gear unit 11.

The low speed advance mode clutch 14 and high speed advance mode clutch 15 function as a clutch device for selectively transmitting the rotation of the countershaft 20 and the rotation of the input disk 5 to the output shaft 19. This continuously variable power-split transmission comprises a controller 40 which selects low speed advance mode, high speed advance mode, and reverse mode from the input torque, engine load, vehicle speed, turbine shaft rotation speed, and so on, and controls the engagement and disengagement of the low speed advance mode clutch 14 and high speed advance mode clutch 15 as well as the application and release of the reverse brake 16 accordingly, as shown in the table of engagement in Table 1.

TABLE 1

| MODE | Clutch 14 | Clutch 15 | Brake 16 |
|---|---|---|---|
| Low speed advance mode | ENGAGED | DISENGAGED | RELEASED |
| High speed advance mode | DISENGAGED | ENGAGED | RELEASED |
| Reverse mode | DISENGAGED | DISENGAGED | APPLIED |

The controller 40 also controls the speed ratio of the double cavity toroidal variator 22. The controller 40 is constituted by a microcomputer comprising a central processing unit (CPU), read-only memory (ROM), random access memory (RAM), and an input/output interface (I/O interface). The controller may be constituted by a plurality of microcomputers.

In this continuously variable power-split transmission, a speed ratio $\alpha 1$ of the first planetary gear mechanism 17, a reduction ratio R1 of the first gear unit 10, and a reduction ratio R2 of the second gear unit 9 are set in accordance with the following equations (1)–(4).

$$\alpha 1 \geq \frac{R1}{R2} \qquad (1)$$

The speed ratio $\alpha 1$ of the first planetary gear mechanism 17 is defined by following equation (2).

$$\alpha 1 = \frac{\text{rotation speed of ring gear}}{\text{rotation speed of sun gear}} = \frac{Zs1}{Zr2} \qquad (2)$$

where, Zs1=a number of teeth of the sun gear 17a; and Zr1=a number of teeth of the ring gear 17d.

The reduction ratio R1 of the first gear unit 10 is defined by the following equation (3).

$$R1 = \frac{Z1in}{Z1out} \qquad (3)$$

where, Z1in=a number of teeth of the gear 10a, and Z1out=a number of teeth of the gear 10b.

As is understood from the equation (3), the reduction ratio R1 of the first gear unit 10 indicates a reduction ratio relating to the transmission of from the output disk 7 to the countershaft 20.

The reduction ratio R2 of the second gear unit 9 is obtained by the following equation (4).

$$R2 = \frac{Z2in}{Z2out} \qquad (4)$$

where, Z2in=a number of teeth of the gear 9a, and Z2out=a number of teeth of the gear 9b of the second gear unit 9.

As is understood from the equation (4), the reduction ratio R2 of the second gear unit 9 indicates a reduction ratio relating to the transmission of rotation from the ring gear 17d to the countershaft 20.

A case in which, in this continuously variable power-split transmission, the input shaft 3 is stationary, the double cavity toroidal variator 22 is in a maximum speed reduction position, the high speed advance mode clutch 15 is disengaged, the reverse brake 16 is released, and the low speed advance mode clutch 14 is engaged will be considered. In this state, when the engine (E) causes the input shaft 3 to rotate in a predetermined direction via the vehicle starting device 2, the carrier 17c of the first planetary gear mechanism 17 rotates in accompaniment with the rotation of the input shaft 3 in the same direction and at the same rotation speed as the input shaft 3.

The rotational torque of the carrier 17c is distributed between and transmitted to the sun gear 17a and the ring gear 17d of the first planetary gear mechanism 17. The rotational torque which is distributed to the sun gear 17a is transmitted to the first gear unit 10 and the countershaft 20 through the toroidal variator 22, or in other words through the input disk 5, power roller 8, and output disk 7. The rotational torque which is distributed to the ring gear 17d, on the other hand, is transmitted to the countershaft 20 from the second gear unit 9. Having converged at the countershaft 20, the rotational torque passes through the third gear unit 11 such that rotation in a predetermined direction and at a lower speed than the input shaft 1 is transmitted to the output shaft 19 of the continuously variable power-split transmission. This rotational torque transmission corresponds to the aforementioned low speed advance mode.

When the double cavity toroidal variator 22 is caused to shift speed to the speed increasing side while low speed advance mode is maintained, the rotation speed of the output shaft 19 increases and the speed ratio of the continuously variable power-split transmission increases.

Herein, the speed ratio of the transmission is defined as an output rotation speed divided by an input rotation speed of the transmission, or an inverse of the speed ratio thereof.

A rotational torque Tin which is distributed to the sun gear 17a of the first planetary gear mechanism 17 and a rotational torque TLLow which acts upon the mechanical loading mechanism 12 are equal.

Providing that the torque which acts upon the input shaft 3 is 1.0, this torque is expressed by the following equation (5).

$$Tin = TLLow = \frac{\alpha 1}{1+\alpha 1} \qquad (5)$$

Next, when the high speed advance mode clutch 15 is engaged and the low speed advance mode clutch 14 is disengaged while the reverse brake 16 is held in a state of release, the transmission direction of the power which passes through the double cavity toroidal variator 22 is reversed from low speed advance mode. That is, similarly to low speed advance mode the rotational torque of the carrier 17c is distributed between and transmitted to the sun gear 17a and ring gear 17d of the first planetary gear mechanism 17, but the power which is distributed to the ring gear 17d is transmitted to the input disk connecting shaft 6 through the second gear unit 9, countershaft 20, first gear unit 10, and the double cavity toroidal variator 22 or in other words the output disk 7, power roller 8, and input disk 5.

On the other hand, the rotational torque which is distributed to the sun gear 17a is transmitted to the input disk connecting shaft 6 through the variator input shaft 4 and the mechanical loading mechanism 12. Having converged at the input disk connecting shaft 6, the rotational torque is transmitted to the output shaft 19 through the bypass shaft 13 and the high speed advance mode clutch 15. This rotational torque transmission corresponds to the aforementioned high speed advance mode.

The reduction ratio of the third gear unit 11 is set in advance such that when the controller 40 switches the continuously variable power-split transmission from low speed advance mode to high speed advance mode, the rotation speed of the output shaft 19 in low speed advance mode and the rotation speed of the output shaft 19 in high speed advance mode are equal.

When the toroidal variator 22 is caused to shift speed to the speed reducing side, or to the speed increasing side from the output disk 7 to the input disk 5, while high speed advance mode is maintained, the rotation speed of the output shaft 19 connected to the input disk 5 increases and the speed ratio of the continuously variable power-split transmission increases.

Providing that the torque which acts upon the input shaft 3 is 1.0, a torque Tout which enters the output disk 7 through the ring gear 17d, second gear unit 9, first countershaft 20, and first gear unit 10 in high speed advance mode is expressed by the following equation (6).

$$Tout = \frac{\frac{R1}{R2}}{1+\alpha} \qquad (6)$$

At this time, the torque TLHigh which acts upon the mechanical loading mechanism 12 is identical to that in low speed advance mode, and is expressed by the following equation (7).

$$TLHigh = TLLow = \frac{\alpha 1}{1+\alpha 1} \qquad (7)$$

Next, the relationship between the rotational torque which acts upon the mechanical loading mechanism 12 and the rotational torque which is transmitted by the variator 22 will be described.

Providing that the torque which acts upon the turbine shaft 3 is 1.0, the torque Tin which acts upon the sun gear 17a of the first planetary gear mechanism 17 is obtained by the following equation (8) in all modes.

$$Tin = \frac{\alpha 1}{1+\alpha 1} \qquad (8)$$

As shown in the equations (5) and (7), the rotational torque TLLow and rotational torque TLHigh which act upon the mechanical loading mechanism 12 are equal to the rotational torque Tin which is distributed to the sun gear 17a of the first planetary gear mechanism 17.

In high speed advance mode, the rotational torque Tout which is input into the output disk 7 through the ring gear 17d, second gear unit 9, countershaft 20, and first gear unit 10 is obtained by the previous equation (6). In this case also, the rotational torque TLHigh which acts upon the mechanical loading mechanism 12 is equal to the rotational torque Tin which is distributed to the sun gear 17a of the first planetary gear mechanism 17.

If, in contrast to the conditions of the previous equation (1), it is assumed that setting is performed such that α1=0.5, R1=28/36, and R2=36/32, Tin is obtained from the equation (8) as 0.3333 and Tout is obtained from the equation (6) as 0.4609.

That is, in low speed advance mode the rotational torque which acts upon the mechanical loading mechanism 12 is 0.3333, and the variator 22 transmits an identical rotational torque from the input disk 5 to the output disk 7.

In high speed advance mode, on the other hand, the rotational torque Tin which acts upon the mechanical loading mechanism 12 remains at 0.3333, but the rotational torque Tout is input into the output disk 7 at 0.4609 and this rotational torque is transmitted to the input disk 5. In other words, the torque transmitted by the variator 22 exceeds the rotational torque which acts upon the mechanical loading mechanism 12.

The mechanical loading mechanism 12 generates a thrusting force which is commensurate with the input torque, thereby minimizing slippage between the input disk 5 and power roller 8 and between the output disk 7 and power roller 8. As noted in the above calculations, however, if the torque transmitted by the variator 22 exceeds the rotational torque which acts upon the mechanical loading mechanism 12, the thrusting force becomes insufficient and it is therefore difficult to prevent slippage of the power roller 8.

The following equation (9) follows the previous equations (7) and (8) in order to prevent the torque TLhigh which acts upon the mechanical loading mechanism 12 from falling below the torque Tout which enters the output disk 7 in high speed advance mode.

$$\frac{\frac{R1}{R2}}{1+\alpha 1} \leq \frac{\alpha 1}{1+\alpha 1} \quad (9)$$

By rearranging the equation, $\alpha 1 \geq R1/R2$ is obtained.

If, for example, $\alpha 1=63/92$, R1=25/36, and R2=33/32 is set, $\alpha 1$ becomes 0.68478 and R1/R2 becomes 0.6734. In low speed advance mode, TLLow and Tin are 0.4065, and in high speed advance mode TLHigh is 0.4065 and Tout is 0.3997. In other words, in both low speed advance mode and high speed advance mode the torque transmitted by the variator 22 does not exceed the rotational torque which acts upon the mechanical loading mechanism 12, and thus slippage of the power roller 8 can be prevented.

The results of a comparison between the speed ratio of the continuously variable power-split transmission, the maximum torque of the low speed advance mode clutch 14, and the maximum torque of the high speed advance mode clutch 15 when the speed ratio range of the double cavity toroidal variator 22 is fixed and the values $\alpha 1$ and R1/R2 are altered are shown in Table 2.

TABLE 2

| ITEM | CASE 1 $\alpha 1 < \frac{R1}{R2}$ | CASE 2 $\alpha 1 \cong \frac{R1}{R2}$ | CASE 3 $\alpha 1 > \frac{R1}{R2}$ | CASE 4 $\alpha 1 \gg \frac{R1}{R2}$ |
|---|---|---|---|---|
| Speed ratio of variator 22 | | | | |
| Min. | 0.4242 | 0.4242 | 0.4242 | 0.4242 |
| Max. | 2.3571 | 2.3571 | 2.3571 | 2.3571 |
| Teeth number ratio $\alpha 1$, first planetary gear mechanism 17 | 0.500 | 0.700 | 0.700 | 0.700 |
| Reduction ratio R1, first gear unit 10 | 0.7778 | 0.7778 | 0.6111 | 0.6111 |
| Reduction ratio R2, second gear unit 9 | 1.1250 | 1.1250 | 1.1250 | 1.1250 |
| Reduction ratio R3, third gear unit 11 | 0.5454 | 0.5454 | 0.6942 | 1.1747 |
| R1/R2 | 0.6914 | 0.6914 | 0.5432 | 0.3210 |
| Speed ratio of transmission | | | | |
| Min. | 0.5289 | 0.5843 | 0.5473 | 0.4919 |
| Max. | 2.9388 | 3.2467 | 3.0413 | 2.7331 |
| Range | 5.5566 | 5.5566 | 5.5566 | 5.5566 |
| Maximum torque exerted on Clutch 14 | 1.6028 | 1.7798 | 2.1111 | 2.3619 |
| Maximum torque exerted on Clutch 15 | 1.4199 | 1.3709 | 1.1650 | 1.0623 |

In a case 1, the relationship of the equation (1) is not satisfied, and in cases 2–4, the relationship of equation (1) is satisfied.

In the case 2, where $\alpha 1$ is substantially equal to R1/R2, numerical values which are suitable for practical use are obtained in the speed ratio range of the continuously variable power-split transmission.

In the case 3, the speed ratio range of the continuously variable power-split transmission is suitable for practical use, but the maximum torque of the low speed advance mode clutch 14 is larger than that of the case 2. In the case 4, the speed ratio range of the continuously variable transmission is excessively small from the point of view of practical use. Also, the maximum torque of the low speed advance mode clutch 14 is even larger than that of the case 3.

According to the above points, the speed ratio $\alpha 1$ of the first planetary gear mechanism 17 is preferably selected to be equal to R1/R2 or a slightly larger value than R1/R2.

In order to cause the vehicle to reverse, the output shaft 19 must be rotated in reverse. This operation is performed by disengaging both the low speed advance mode clutch 14 and high speed advance mode clutch 15 and applying the reverse brake 16. As a result, the power distributed in the first planetary gear mechanism 17 converges in the countershaft 20, similarly to the operation in low speed advance mode, and is reversed by the second planetary gear mechanism 18, whereupon the reversed rotational torque is transmitted through the third gear unit 11 to the output shaft 19. This rotational torque transmission corresponds to the aforementioned reverse mode.

As can be understood from above, the reverse mode corresponds to low speed advance mode where the output rotation is reversed, and therefore the rotational torque which acts upon the mechanical loading mechanism 12 is equal to that in low speed advance mode.

Table 3 shows an example of setting of a variator speed ratio, speed ratios for the planetary gears, reduction ratios for the gear units, and the rotational torque which acts upon the loading mechanism. This setting gives an appropriate speed ratio for a transmission for use in a vehicle.

TABLE 3

| ITEM | Low speed advance mode | | High speed advance mode | | Reverse mode |
|---|---|---|---|---|---|
| | Lowest | Highest | Highest | Lowest | Lowest |
| Speed ratio, variator 22 | 0.4082 | 2.4495 | 2.4495 | 0.4082 | 2.4495 |
| Teeth number ratio α1, first planetary gear mechanism 17 | ← | | 0.6848 | | → |
| Teeth number ratio, second planetary gear mechanism 18 | ← | | 0.5 | | → |
| Reduction ratio R1 first gear unit 10 | ← | | 0.6944 | | → |
| Reduction ratio R2, second gear unit 9 | ← | | 1.0313 | | → |
| Reduction ratio R3, third gear unit 11 | ← | | 0.5682 | | → |
| Speed ratio of transmission | 3.5362 | 1.4335 | 1.3855 | 0.5692 | 3.5362 |
| Distribution ratio of torque | ← | | 0.4065/0.5935 | | → |
| Torque exerted on loading mechanism 12 | 0.4065 | 0.4065 | 0.3997 | 0.3997 | 0.4065 |

According to this invention, the input rotational torque of the mechanical loading mechanism 12 takes a value which does not fall below the transmission torque of the variator 22 in all modes, thereby preventing slippage of the power rollers due to insufficient thrusting force which may impair the power rollers and disks. Since slippage of the power rollers are prevented, the power transmission efficiency of the variator 22 is also improved.

According to this invention, since the second differential gear mechanism 18 having the low speed advance mode clutch 14 and reverse brake 16 for switching between advance and reverse is disposed on the countershaft 20, the number of countershafts may be reduced. Moreover, in both low speed advance mode and reverse mode, which require large rotational torque, only the rotational torque of the countershaft 20 is output to the output shaft 19 and therefore the number of members requiring strength can be reduced. Since the number of the counter shafts can be reduced with respect to the aforementioned prior art VDI Berichte Nr. 1565, 2000 by using a common countershaft for both the low speed advance mode and reverse mode, and the variator 22 can be made small in size, a compact and low-cost continuously variable power-split transmission can be realized.

In a front engine/rear drive vehicle, the disposal space for the transmission may become small toward the rear. In this power-split transmission, the second planetary gear mechanism 18 is installed on the rear end of the countershaft 20 under the high speed advance clutch 15, so the entire form of the transmission is particularly appropriate for installing in a front engine/rear drive vehicle.

The contents of Tokugan 2002-229481, with a filing date of Aug. 7, 2002 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example in the above embodiment, the first gear unit 10 and second gear unit 9 are each constituted by a combination of a plurality of gears, but a power transmission mechanism such as a chain or belt may be used in place of these gear units.

In the above embodiment, the first planetary gear mechanism 17 is constituted by a single-pinion type, but it may also be constituted by a double pinion type planetary gear mechanism without modifying the definition of the speed ratio α1 as $$\frac{Zs1}{Zr2}.$$

When the double pinion type planetary mechanism is adapted for the first planetary gear mechanism 17, such a configuration is possible that the ring gear is coupled to the input shaft 1 as the first rotating member, the sun gear is coupled to the variator input shaft 4 as the second rotating member, and the carrier is coupled to the gear 9a as the third rotating member.

The embodiments of this invention in which an exclusive property or privilege is claimed are defined as follows:

What is claimed is:

1. A continuously variable power-split transmission comprising:
   an input shaft which is driven by an engine;
   an output shaft;
   a first differential gear mechanism which comprises a first rotating member connected to the input shaft, a second rotating member, and a third rotating member, and which distributes the rotation of the first rotating member between the second rotating member and the third rotating member;
   a countershaft;
   a toroidal variator and a first power transmission mechanism which are connected in series for transmitting rotation between the second rotating member and the countershaft, the toroidal variator comprising an input disk, an output disk, and a power roller which is gripped between the input disk and output disk by a thrusting force corresponding to the rotational torque of the second rotating member, and the first power transmission mechanism transmitting rotation between the output disk and the countershaft;
   a second power transmission mechanism for transmitting the rotation of the third rotation member to the countershaft; and
   a clutch device for selectively transmitting the rotation of the countershaft and the rotation of the input disk to the output shaft;
   wherein a reduction ratio R1 relating to the transmission of rotation by the first transmission mechanism from the output disk to the countershaft, a reduction ratio R2 of the second power transmission mechanism, and a speed ratio α1 of the third rotating member and the second rotating member are set to values at which, in a state where the clutch device is transmitting the rotation of the input disk to the output shaft, the rotational torque of the second rotating member does not fall below the rotational torque which is transmitted from the first power transmission unit to the output disk.

2. The continuously variable power-split transmission as defined in claim 1, wherein the speed ratio α1 is set at a value which does not fall below the ratio of the reduction ratio R1 and the reduction ratio R2.

3. The continuously variable power-split transmission as defined in claim 1, wherein the first differential gear mechanism comprises a planetary gear mechanism comprising a carrier as the first rotating member, a sun gear as the second rotating member, a ring gear as the third rotating member and pinions each of which is supported by the carrier and meshes with the sun gear and the ring gear, and wherein the speed ratio is defined by the ratio of the number of teeth of the sun gear and the number of teeth of the ring gear.

4. The continuously variable power-split transmission as defined in claim 1, wherein the transmission further comprises a controller which functions to realize a first mode in which the rotation of the countershaft, to which the rotation of the second rotating member via the toroidal variator and the rotation of the third rotating member via the second power transmission mechanism are simultaneously transmitted, is output to the output shaft, and a second mode in which the rotation of the input disk, to which the rotation of the second rotating member and the rotation of the third rotating member via the second power transmission mechanism and the toroidal variator are simultaneously transmitted, is output to the output shaft, as well as to vary a speed ratio of the toroidal variator.

5. The continuously variable power-split transmission as defined in claim 1, wherein the transmission further comprises a second differential gear mechanism which is capable of reversing the rotation of the countershaft.

6. The continuously variable power-split transmission as defined in claim 1, wherein the transmission further comprises a loading mechanism which converts the rotational torque of the second rotating member to the thrusting force acting upon the input disk.

* * * * *